United States Patent Office 3,446,788
Patented May 27, 1969

3,446,788
POLYMERIZATION OF BUTADIENE BY A CATALYST CONTAINING ALUMINUM ALKYLS, ORGANONICKEL COMPOUNDS AND METAL FLUORIDES
Morford C. Throckmorton and William M. Saltman, Akron, Ohio, assignors to The Goodyear Tire & Rubber Company, Akron, Ohio, a corporation of Ohio
No Drawing. Filed Mar. 20, 1967, Ser. No. 624,219
Int. Cl. C08d 1/14, 3/08; B01j 11/84
U.S. Cl. 260—94.3                 10 Claims

ABSTRACT OF THE DISCLOSURE

A method and a catalyst system for the solution polymerization of butadiene or butadiene in mixture with other diolefins to form polymers containing a high content of cis 1,4 addition is described. The solution polymerization is carried out under conventional polymerization conditions. The catalyst employed is a mixture of (1) organometallic compounds of metals of Groups I, II and III; (2) organonickel compounds and (3) a metal fluoride selected from the group consisting of phosphorus pentafluoride,
vanadium pentafluoride,
uranium hexafluoride,
osmium hexafluoride,
rhenium hexafluoride,
iodine pentafluoride,
antimony pentafluoride,
tin tetrafluoride,
antimony trifluoride,
indium trifluoride,
arsenic pentafluoride,
bismuth pentafluoride,
niobium pentafluoride,
tantalum pentafluoride,
titanium tetrafluoride,
zirconium tetrafluoride,
zinc difluoride,
platinum hexafluoride,
hafnium tetrafluoride,
thorium tetrafluoride,
lead tetrafluoride,
cadmium difluoride,
titanium trifluoride,
iron trifluoride,
cobalt trifluoride,
vanadium trifluoride,
palladium trifluoride,
germanium tetrafluoride,
tellurium tetrafluoride,
copper difluoride and silver difluoride.

This invention is directed to methods of polymerizing butadiene and butadiene in mixture with other diolefins to form polymers having a high content of cis 1,4 addition. It is also directed to catalyst systems useful for this purpose.

Polymers of butadiene or butadiene in mixture with other diolefins containing a high proportion of the butadiene units in the cis 1,4 configuration possess properties which make then useful as synthetic rubbers.

It is an object of this invention to provide a method whereby butadiene can be polymerized to a high content of cis 1,4 polybutadiene. Another object is to provide a catalyst system by which these polymerizations may be accomplished. Another object is to form copolymers of isoprene or other diolefins and butadiene in which the polybutadiene segment has a high content of cis 1,4 structure. Other objects will become apparent as the description proceeds.

According to the invention, butadiene or butadiene in combination with other diolefins is polymerized by contact under solution polymerization conditions with a catalyst comprising (1) at least one organometallic compound in which the metal is selected from Groups I, II and III of the periodic system, (2) at least one organonickel compound and (3) a metal fluoride selected from the group consisting of phosphorus pentafluoride,
vanadium pentafluoride,
uranium hexafluoride,
osmium hexafluoride,
rhenium hexafluoride,
iodine pentafluoride,
antimony pentafluoride,
tin tetrafluoride,
antimony trifluoride,
induim trifluoride,
arsenic pentafluoride,
bismuth pentafluoride,
niobium pentafluoride,
tantalum pentafluoride,
titanium tetrafluoride,
zirconium tetrafluoride,
zinc difluoride,
platinum hexafluoride,
hafnium tetrafluoride,
thorium tetrafluoride,
lead tetrafluoride,
cadmium difluoride,
titanium trifluoride,
iron trifluoride,
cobalt trifluoride,
vanadium trifluoride,
palladium trifluoride,
germanium tetrafluoride,
tellurium tetrafluoride,
copper difluoride and silver difluoride.

The organometallic compounds useful in this invention are organocompounds of such metals as lithium, sodium, potassium, rubidium, cesium, magnesium, calcium, strontium, beryllium, barium, zinc, cadmium, aluminum, gallium and indium. By the term, "organometallic" is meant alkyl, cycloalkyl, aryl, arylalkyl, alkaryl radicals are attached to the metal to form the organo compound of the particular metal.

Of the organometallic compounds useful in this invention, it is preferred to use organoaluminum compounds, organomagnesium compounds, organozinc compounds and organolithium compounds.

By the term "organoaluminum compound" is meant any organoaluminum compound responding to the formula

in which $R_1$ is selected from the group consisting of alkyl (including cycloalkyl), aryl, alkaryl, arylalkyl, hydrogen and fluorine, $R_2$ and $R_3$ being selected from the group of alkyl (including cycloalkyl), aryl, alkaryl, alkoxy and arylalkyl. Representative of the compounds responding to the formula set forth above are:

diethylaluminum fluoride,
di-n-propylaluminum fluoride,
di-n-butylaluminum fluoride,
diisobutylaluminum fluoride, dihexylaluminum fluoride,
dioctylaluminum fluoride, and
diphenylaluminum fluoride.

Also included are diethylaluminum hydride,
di-n-propylaluminum hydride,
di-n-butylaluminum hydride,
diisobutylaluminum hydride,
diphenylaluminum hydride,
di-p-tolylaluminum hydride,
dibenzylaluminum hydride,
phenylethylaluminum hydride,
phenyl-n-propylaluminum hydride,
p-tolylethylaluminum hydride,
p-tolyl-n-propylaluminum hydride,
p-tolylisopropylaluminum hydride,
benzylethylalumium hydride,
benzyl-n-propylaluminum hydride, and
benzylisopropylaluminum hydride and
other organoaluminum hydrides. Also included are diethylethoxyaluminum and dipropylethoxyaluminum.

Also included are trimethylaluminum,
triethylaluminum,
tri-n-propylaluminum,
triisopropylaluminum,
tri-n-butylaluminum,
triisobutylaluminum,
tripentylaluminum,
trihexylaluminum,
tricyclohexylaluminum,
trioctylaluminum,
triphenylaluminum,
tri-p-tolylaluminum,
tribenzylaluminum,
ethyldiphenylaluminum,
ethyl-di-p-tolylaluminum,
ethyldibenzylaluminum,
diethylphenylaluminum,
diethyl-p-tolylaluminum,
diethylbenzylaluminum and other triorganoaluminum compounds.

By the term "organomagnesium compounds" is meant first any organomagnesium complex responding to the formula $R_aMgX_b$ where R may be alkyl, aryl, arylalkyl or alkaryl; X is a halogen, and $a$ and $b$ are mole fractions whose sum equals 2 while the ratio of $a/b$ is greater than 2 but is not infinite. Representative among the compounds responding to the formula set forth above are ethylmagnesium chloride complex, cyclohexylmagnesium bromide complex and phenylmagnesium chloride complex. Such compounds are usually prepared in the absence of ether.

Also "organomagnesium compounds" means any organomagnesium compound or any organomagnesium halide of the Grignard type corresponding to the formulas $R_2Mg$ or $RMgY$ where R may be alkyl, aryl, arylalkyl or alkaryl and M is fluorine, or $R'R''Mg$ where R' may be alkyl, aryl or alkaryl and R'' may be either alkyl, aryl, arylalkyl or alkaryl. Representative among the compounds responding to these formulae are diethylmagnesium, dipropylmagnesium, ethylmagnesium fluoride and phenylmagnesium fluoride.

By the term "organozinc compound" is meant any organozinc compound responding to the formula $R_2Zn$ where R may be alkyl, aryl, alkaryl or arylalkyl. Representative among such compounds are diethylzinc, dibutylzinc or diphenylzinc.

By the term "organolithium compounds" is any organolithium compound responding to the formula R-Li where R is an alkyl, alkaryl, arylalkyl or aryl group. Representative among the compounds responding to the formula set forth above are ethyllithium, propyllithium, n-, sec- or t-butyllithium, hexyllithium, styryllithium or phenyllithium. Also, the organolithiumaluminum compounds may be used. These compounds respond to the formula $R'R''_3LiAl$ where R' and R'' may be alkyl, alkaryl or arylalkyl groups and R' and RR'' may or may not be the same group. Representative of these compounds are n-butyltriisobutyllithium aluminum, tetrabutyllithium aluminum, butyltriethyllithium aluminum, tetraisobutyllithium aluminum and styryltrinormalpropyllithium aluminum.

Representative of other organometallic compounds which may be employed in this invention are sodium, potassium, calcium, beryllium, cadmium and mercury alkyls, arkaryls, arylalkyls and aryls.

The component of the catalyst of this invention which contains nickel may be any organonickel compound. It is preferred to employ a soluble compound of nickel. These soluble nickel compounds are usually compounds of nickel with a mono or bi-dentate organic ligand containing up to 20 carbon atoms. "Ligand" is defined as an ion or molecule bound to and considered bonded to a metal atom or ion. Mono-dentate means having one position through which covalent or coordinate bonds with the metal may be formed; bi-dentate means having two positions through which covalent or coordinate bonds with the metal may be formed. By the term "soluble" is meant soluble in inert solvents. Thus, any nickel salt of an organic acid containing from about 1 to 20 carbon atoms may be employed. Representative of such organonickel compounds are nickel benzoate, nickel acetate, nickel naphthenate, bis(alpha furyl dioxime) nickel, nickel octanoate, nickel palmitate, nickel stearate, nickel acetylacetonate, bis(salicylaldehyde) ethylene diimine nickel and nickel salicaldehyde. Nickel tetracarbonyl also may be employed as the nickel containing catalyst in this invention. The preferred component containing nickel is a nickel salt of carboxylic acid or an organic complex compound of nickel.

The third components of the catalyst which are the metal fluorides listed above should be, of course, anhydrous and as pure as possible. Since some of these metal fluorides are gases, it may be more desirable to dissolve them in a solvent and charge them to the polymerization system as liquid solutions. Such solvents may be any alkyl, aryl, alkaryl or arylalkyl hydrocarbons, benzene or heptane being usually preferred.

The three catalyst components may be charged separately in either stepwise or simultaneous addition to the polymerization system or they may be mixed with one another in an inert solvent and this "preformed" catalyst can then be added to the monomer-solvent polymerization system.

The three component catalyst system of this invention has shown polymerization activity over a wide range of catalyst concentrations and catalyst ratios. The three catalyst components inter-react to form the active catalyst. As a result, the optimum concentration for any one catalyst is dependent upon the concentration of each of the other catalyst components. While polymerizations will occur over a wide range of catalyst concentrations and ratios, polymers having the most desirable properties are obtained over a narrower range.

When the metal fluoride is $PF_5$, $VF_5$, $UF_6$, $OsF_6$, $ReF_6$, $IF_5$ or $SbF_5$, the mole ratio of the organometallic compound (Me) to the organonickel compound (Ni) should range from about 2/1 to about 60/1, the mole ratio of the metal fluoride ($MeF_x$) to the organometallic compound (Me) should range from about 1.2/1 to about 3/1 and the mole ratio of the metal fluoride to the organonickel compound should range from about 2/1 to about 35/1. When the metal fluoride is $SnF_4$, $SbF_3$, $InF_3$, $AsF_5$, $BiF_5$, $NbF_5$ or $TaF_5$, the Me/Ni mole ratio should range from about 2/1 to about 60/1, the mole ratio of the $MeF_x$/Me should range from about 1.2/1 to about 10/1 and the $MeF_x$/Ni mole ratio should range from about 2/1 to about 125/1. When the metal fluoride employed is TiF$_4$, TiF$_3$, ZrF$_4$, ZnF$_2$, PtF$_6$, HfF$_4$, ThF$_4$, PbF$_4$, CdF$_2$, FeF$_3$, CoF$_3$, VF$_3$, PdF$_3$, GeF$_4$, TeF$_4$, CuF$_2$ or AgF$_2$, the Me/Ni mole ratio should range from about 2/1 to about 60/1, the MeF$_x$/Me mole ratio should range from about 2.5/1 to about 20/1 and the MeF$_x$/Ni mole ratio should range from about 5/1 to about 250/1.

The concentration of the catalyst employed depends on factors such as purity, rate desired, temperature and other factors, therefore, specific concentrations cannot be set forth except to say that catalytic amounts are used. Some specific concentrations and ratios which produce elastomers having desirable properties will be illustrated in the examples given herein to explain the teachings of this invention.

In general, the polymerizations of this invention are carried out in any inert solvent, and thus, are solution polymerizations. By the term "inert solvent" is meant that the solvent or diluent does not enter into the structure of the resulting polymer nor does it adversely affect the properties of the resulting polymer nor does it have any adverse effect on the activity of the catalyst employed. Such solvents are usually aliphatic, aromatic, or cycloaliphatic hydrocarbons, examples of which are pentane, hexane, heptane, toluene, benzene, cyclohexane and the like. Preferred solvents are hexane and benzene. The solvent/monomer volume ratio may be varied over a wide range. Up to 20 or more to 1 volume ratio of solvent to monomer can be employed. It is usually preferred or more convenient to use a solvent/monomer volume ratio of about 3/1 to about 6/1. Suspension polymerization may be carried out by using a solvent, e.g., butane or pentane, in which the polymer formed is insoluble. It should be understood, however, that it is not intended to exclude bulk polymerizations from the scope of this application.

It is usually desirable to conduct the polymerizations of this invention employing air-free and moisture-free techniques.

The temperatures employed in the practice of this invention have not been found to be critical and may vary from a low temperature such as −10° C. or below up to high temperatures of 100° C. or higher. However, a more desirable temperature range is between about 30° C. and about 90° C. Ambient pressures are usually used but higher or lower pressure may be employed.

The practice of this invention is further illustrated by reference to the following examples which are intended to be representative rather than restrictive of the scope of this invention. Unless otherwise noted, all parts and percentages are by weight. Dilute solution viscosities (DSV) have been determined in toluene at 30° C.

Example I

A butadiene-benzene solution was purified by passing through a silica gel column and by sparging with purified nitrogen. One hundred milliliters of this solution which contained 10 grams of butadiene was placed in a series of polymerization vessels. Triethylaluminum (TEAL) and nickel octanoate (Ni oct) in amounts as indicated in the following table were added. The vessel was closed and the amounts of the various metal fluorides, as indicated in the table below, were injected. These mixtures were allowed to polymerize at a temperature of 50° C. while being agitated for a period of 18 hours. The resulting polymers were stopped by the injection of 0.1 gram of 1,1′,1″-nitrilotri-2-propanol and 2,4-di-t-butyl-para-cresol, and dried at 45° C. at a vacuum. The yields were calculated and are reported in the table below. The DSV was determined and it is reported in the table. The cis 1,4 content of each of the polymers was determined by infrared analysis and is reported in the table.

TABLE I

| Exp. No. | Metal fluoride | Millimoles/100 gms. Bd | | | Yield wt. percent | Percent cis | DSV |
|---|---|---|---|---|---|---|---|
| | | TEAL | NiOct | MeF$_x$ | | | |
| 1 | SnF$_4$ | 1.0 | .05 | 3.0 | 84 | 96 | 2.8 |
| 2 | PF$_5$ | 0.6 | .05 | 1.0 | 57 | 94 | 2.0 |
| 3 | SbF$_3$ | 1.0 | .10 | 3.0 | 52 | 94½ | 1.5 |
| 4 | TiF$_4$ | 1.0 | .10 | 6.0 | 99 | 97 | 2.7 |
| 5 | ZrF$_4$ | 1.0 | .05 | 6.0 | 84 | 97 | 2.0 |
| 6 | TiF$_3$ | 1.0 | .10 | 12.0 | 83 | 96 | 3.6 |
| 7 | ZnF$_2$ | 1.0 | .10 | 6.0 | 34 | 96 | 4.1 |
| 8 | FeF$_3$ | 1.0 | .10 | 12.0 | 39 | 97 | 3.8 |
| 9 | CoF$_3$ | 1.0 | .05 | 12.0 | 34 | 96 | 3.6 |
| 10 | VF$_3$ | 1.0 | .10 | 12.0 | 20 | 96 | 3.6 |
| 11 | InF$_3$ | 1.0 | .05 | 3.0 | 15 | [1] 96 | |

[1] IR film analysis.

Example II

Polymerizations were prepared in the manner of that of Example I using various metal fluorides except that the infrared analysis was not run. The results and amounts of catalyst and the metal fluoride employed are set forth in the table below.

TABLE II

| Exp. No. | Metal fluoride | Millimoles/100 gms. Bd | | | Yield, weight percent | DSV |
|---|---|---|---|---|---|---|
| | | TEAL | NiOct | MeF$_x$ | | |
| 1 | PF$_5$ | 0.6 | 0.05 | 0.75 | 17 | |
| 2 | SnF$_4$ | 1 | .10 | 6 | 66 | 3.8 |
| 3 | TiF$_3$ | 1 | .10 | 12 | 83 | 3.6 |
| 4 | ZrF$_4$ | 1 | .05 | 6 | 65 | 2.9 |

While certain representative embodiments and details have been shown for the purpose of illustrating the invention, it will be apparent to those skilled in this art that various changes and modifications may be made therein without departing from the spirit or scope of the invention.

What is claimed is:

1. The process for the polymerization of butadiene and butadiene in mixture with other diolefins to form polymers containing a high proportion of the butadiene units in the cis configuration comprising contacting butadiene and butadiene in mixture with other diolefins under polymerization conditions with a catalyst comprising (1) at least one organometallic compound in which the metal is selected from Groups I, II and III of the Periodic System, (2) at least one organonickel compound selected from the group consisting of nickel salts of carboxylic acids, organic complex-compounds of nickel and nickel tetracarbonyl and (3) a metal fluoride selected from the group consisting of phosphorous pentafluoride, vanadium pentafluoride, uranium hexafluoride, osmium hexafluoride, rhenium hexafluoride, iodine pentafluoride, antimony pentafluoride, tin tetrafluoride, antimony trifluoride, indium trifluoride, arsenic pentafluoride, bismuth pentafluoride, niobium pentafluoride, tantalum pentafluoride, titanium tetrafluoride, zirconium tetrafluoride, zinc difluoride, platinum hexafluoride, hafnium tetrafluoride, thorium tetrafluoride, lead tetrafluoride, cadmium difluoride, titanium trifluoride, iron trifluoride, cobalt trifluoride, vanadium trifluroide, palladium trifluoride, germanium tetrafluoride, tellurium tetrafluoride, copper difluoride and silver difluoride.

2. The process according to claim 1 in which butadiene 1,3 alone is employed.

3. The process according to claim 1 in which the organickel compound is selected from the group consisting of nickel salts of carboxylic acids and organic complex compounds of nickel.

4. The process according to claim 1 in which the organometallic compound is selected from the group consisting of organoaluminum compounds, organomagnesium compounds, organozinc compounds and organolithium compounds.

5. The process according to claim 1 in which the metal fluoride is selected from the group consisting of phosphorous pentafluoride, vanadium pentafluoride, uranium hexafluoride, osmium hexafluoride, rhenium hexafluoride, iodine pentafluoride, and antimony pentafluoride and in which the mole ratio of the organometallic compound to the organonickel compound ranges from about 2/1 to about 60/1, the mole ratio of the metal fluoride to the organometallic compound ranges from about 1.2/1 to bout 3/1 and the mole ratio of the metal fluoride to the organonickel compound ranges from about 2/1 to about 35/1.

6. The process according to claim 1 in which the metal fluoride is selected from the group consisting of tin tetrafluoride, antimony trifluoride, indium trifluoride, arsenic pentafluoride, bismuth pentafluoride, niobium pentafluoride and tantalum pentafluoride, and in which the mole ratio of the organometallic compound to the organonickel compound ranges from about 2/1 to about 60/1, the mole ratio of the metal fluoride to the organometallic compound ranges from about 1.2/1 to about 10/1 and the mole ratio of the metal fluoride to the organonickel compound ranges from about 2/1 to about 125/1.

7. The process according to claim 1 in which the metal fluoride is selected from the group consisting of titanium tetrafluoride, titanium trifluoride, zirconium tetrafluoride, zinc difluoride, platinum hexafluoride, hafnium tetrafluoride, thorium tetrafluoride, lead tetrafluoride, cadmium difluoride, iron trifluoride, cobalt trifluoride, vanadium trifluoride, palladium trifluoride, germanium tetrafluoride, tellurium tetrafluoride, copper difluoride and silver defluoride, and in which the mole ratio of the organometallic compound to the organonickel compound ranges from about 2/1 to about 60/1, the mole ratio of the metal fluoride to the organometallic compound ranges from about 2.5/1 to about 20/1 and the mole ratio of the metal fluoride to the organonickel compound ranges from about 5/1 to about 250/1.

8. The process according to claim 4 in which the organometallic compound is an organoaluminum compound.

9. The process according to claim 8 in which the organoaluminum compound is an aluminum trialkyl.

10. A catalyst composition comprising (1) at least one organometallic compound in which the metal is selected from Groups I, II and III of the Periodic System, (2) at least one organonickel compound selected from the group consisting of nickel salts of carboxylic acids, organic complex-compounds of nickels and nickel tetracarbonyl and (3) a metal fluoride selected from the group consisting of phosphorous pentafluoride, vandium pentafluoride, uranium hexafluoride, osmium hexafluoride, rhenium hexafluoride, iodine pentafluoride, antimony pentafluoride, tin tetrafluoride, antimony trifluoride, indium trifluoride, arsenic pentafluoride, bismuth pentafluoride, niobium pentafluoride, tantalum pentafluoride, titanium tetrafluoride, zirconium tetrafluoride, zinc defluoride, platinum hexafluoride, hafnium tetrafluoride, thorium tetrafluoride, lead tetrafluoride, cadmium difluoride, titanium trifluoride, iron trifluoride, cobalt trifluoride, vanadium trifluoride, palladium trifluoride, germanium tetrafluoride, tellurium tetrafluoride, copper difluoride and silver difluoride.

References Cited

UNITED STATES PATENTS 3,143,537   8/1964   Hagemeyer et al. _____ 260—93.7

JAMES A. SEIDLECK, *Primary Examiner.*

R. A. GAITHER, *Assistant Examiner.*

U.S. Cl. X.R.

252—429; 260—82.1

UNITED STATES PATENT OFFICE
CERTIFICATE OF CORRECTION

Patent No. 3,446,788                      May 27, 1969

Morford C. Throckmorton et al.

It is certified that error appears in the above identified patent and that said Letters Patent are hereby corrected as shown below:

Column 2, line 22, "induim" should read -- indium --.
Column 4, line 5, "RR″" should read -- R″ --; line 14, "arkaryls" should read -- alkaryls --. Column 5, line 73, "(Ni oct)" should read -- (Ni Oct) --. Column 7, line 17, "bout" should read -- about --; line 38, "deflu-" should read -- diflu- --.
Column 8, line 24, "deflu-" should read -- diflu- --.

Signed and sealed this 2nd day of June 1970.

(SEAL)
Attest:

Edward M. Fletcher, Jr.                  WILLIAM E. SCHUYLER, JR.
Attesting Officer                              Commissioner of Patents